United States Patent [19]

Nickerson

[11] Patent Number: 6,078,406
[45] Date of Patent: Jun. 20, 2000

[54] JOB INFORMATION COMMUNICATION SYSTEM FOR A PRINTING SYSTEM

[75] Inventor: Michael J. Nickerson, Penfield, N.Y.

[73] Assignee: Xerox Corporation, Stamford, Conn.

[21] Appl. No.: 09/114,989

[22] Filed: Jul. 14, 1998

Related U.S. Application Data

[62] Division of application No. 08/584,583, Jan. 11, 1996.

[51] Int. Cl.[7] .............................. H04N 1/00; H04N 1/32; G03G 15/00; H04M 11/00
[52] U.S. Cl. .................... 358/468; 358/405; 379/100.05; 379/100.06; 399/8
[58] Field of Search ................................... 358/400, 405, 358/434, 435, 436, 439, 442, 468; 399/8; 379/100.05, 100.06

[56] References Cited

U.S. PATENT DOCUMENTS

| | | | |
|---|---|---|---|
| 4,956,860 | 9/1990 | Murata | 379/100.06 |
| 5,127,047 | 6/1992 | Bell et al. | 379/100.06 |
| 5,140,439 | 8/1992 | Tanaka | 358/405 |
| 5,226,074 | 7/1993 | Han | 379/100.05 |
| 5,289,532 | 2/1994 | Ishikawa et al. | 379/100.14 |
| 5,295,182 | 3/1994 | Fujii | 379/100.05 |
| 5,717,744 | 2/1998 | Yoshida et al. | 358/434 |
| 5,825,990 | 10/1998 | Heo et al. | 395/113 |

FOREIGN PATENT DOCUMENTS

| | | | |
|---|---|---|---|
| 1-295563 | 11/1989 | Japan | H04N 1/32 |
| 3-192952 | 8/1991 | Japan | H04M 11/00 |
| 5-14577 | 1/1993 | Japan | H04N 1/32 |
| 6-62147 | 3/1994 | Japan | H04M 11/00 |
| 6-189008 | 7/1994 | Japan | H04M 11/00 |

*Primary Examiner*—Kimberly A. Williams
*Attorney, Agent, or Firm*—Gary B. Cohen; Philip E. Blair

[57] ABSTRACT

A transmission job originating station for controlling transmission of job information, based on the processing of a print job in a printing system, is provided. The control system includes a document generating subsystem for providing at least a portion of the print job to be delivered to a print machine and a user interface for programming a set of information including one or more confirmation destinations with each confirmation destination being disposed remotely of the transmission job originating station. The transmission job originating station further includes a control subsystem which, in response to the processing of at least a portion of the print job at the printing machine, reads the set of information and determines each confirmation destination, programmed with the user interface, to which the job information is to be transmitted.

6 Claims, 8 Drawing Sheets

JOB INFORMATION COMMUNICATION SYSTEM FOR A PRINTING SYSTEM

This application is divisional of application Ser. No. 08/584,583, filed Jan. 11, 1996.

FIELD OF THE PRESENT INVENTION

The present invention relates generally to providing job information with information regarding the execution of a corresponding job and, more particularly, to a technique in which a job is provided to a printing machine from a transmission job originating station and the job is programmed so that when at least a portion of the job has been processed by the printing machine a consumer of the job is provided with job information at a location remotely disposed with respect to the transmission job originating station.

BACKGROUND OF THE PRESENT INVENTION

It has been feasible, for some time now, to deliver documents from a point of origin to a remote location through use of facsimile technology. Various techniques for transmitting documents, via a facsimile transmission system are discussed in U.S. Pat. No. 5,295,181 to Kuo. The entire contents of U.S. Pat. No. 5,295,181 are hereby incorporated by reference.

It has also been feasible, for some time now, to transmit jobs from a point of origin to a remote location through use of a printing arrangement employing a local or wide area network. This sort of network printing is often facilitated through use of a print service of the type disclosed in U.S. Pat. No. 5,220,674 to Morgan et al. The entire contents of U.S. Pat. No. 5,220,674 are hereby incorporated by reference.

It is known that, pursuant to printing a job, it is desirable to provide a consumer or user of the job output with a "sheet" reflecting information regarding execution of the corresponding job. In one known example, the job information sheet may include a print reflecting characteristic values used to process the job. In another example, the sheet may include information confirming that a job has been transmitted to a remote facsimile receiving system. The confirmation sheet commonly includes other information, such as when transmission of the job was completed, how many pages were transmitted, the location of the receiving system, etc.

As is further known, a job information "sheet" can be either printed as hardcopy or transmitted, by way of a network, back to a point of origin ("transmission job originating station"), such as a host client on the network. In one known example, a job is provided to a network print engine and upon completion of the job, notification to that effect is provided to a host client. More particularly, in a known network printing system with a server, provided by Novell Corporation, and a workstation ("transmission job originating station") using a Windows® operating system, a print job is transmitted from the workstation ("transmission job originating station") to the server. After the server has delivered the print job to a suitable printer on the network and the job has been printed, a confirmation notice is transmitted back to the workstation ("transmission job originating station") for display therewith.

In the area of facsimile printing, a feature referred to as "delayed facsimile transmission" is provided. This feature allows a facsimile job to be scanned at one time, with a transmitting machine ("transmission job originating station"), and then transmitted to a remote receiving station at another time. In delayed facsimile transmission, a confirmation page is provided to a job transmitter at the transmission job originating station, the transmission job originating station being either a conventional transmitting machine, such as a facsimile machine, or at a workstation which has fax capabilities and linked to a telecommunication port or a multi-functional printing device which is capable of transmitting the document as a facsimile document to a remote receiving station. The ability to provide communication between a workstation and a multi-functional printing machine is publicly available through a Xerox multi-functional printing system, known as "Document Centre 20"$_{TM}$, which permits a workstation ("transmission job originating station") to be coupled with a multi-functional printing machine, including a facsimile device.

Known notification schemes are capable of providing confirmation or job run information at a point where the job originated ("transmission job originating station"). The problem with this approach, particularly in the area of delayed facsimile transmission, is that the job originator may not be present at the transmission job originating station to which the confirmation is conventionally delivered. This problem is aggravated when the user is off-site, relative to the transmission job originating station (point of confirmation delivery), and the job information sheet indicates that the job cannot be executed due to one or more faults. At least in some instances, if the job originator only knew of the fault, the difficulty in executing the job could be readily remedied.

It would be desirable to provide a technique that permits the job originator to obtain job information about the job while the job originator is off-site, relative to the transmission job originating station (point of confirmation delivery), so that the job originator can remedy simple faults in the job or, as a minimum, be apprised that transmission/printing of the job, at least for the time being, is not possible.

SUMMARY OF THE PRESENT INVENTION

In accordance with a first aspect of the present invention, there is provided a transmission job originating station for use in a printing system with a printing machine for producing a set of prints from a print job, including a set of image data, in accordance with a job ticket. The job ticket includes a set of job execution attributes with each job execution attribute being associated with a programmable set of information for defining the corresponding job execution attribute. A first one of the programmable sets of information instructs the printing system as to a manner in which job information is generated when at least a portion of the set of image data is processed in accordance with the job ticket. The transmission job originating station, which controls transmission of the job information to the one or more output confirmation destinations, includes: a document generating subsystem for providing at least a portion of the print job to be delivered to the print machine; a user interface, communicating with said document generating subsystem, for programming a second one of the programmable sets of information, the second set of information including one or more confirmation destinations with each confirmation destination being disposed remotely of the transmission job originating station; and a control subsystem which, in response to processing at least a portion of the image data at the printing machine, reads the second set of job information and determines each confirmation destination, programmed with said user interface, to which the job information is to be transmitted.

In accordance with a second aspect of the present invention, there is provided a facsimile machine including an image data source and a transmitting subsystem to transmit image data to a first remote receiving station. A receiving subsystem receives job status information from the first remote receiving station, and a control subsystem causes the transmitting subsystem to transmit the job status information to a second remote receiving station.

In accordance with a third aspect of the present invention there is provided a method for printing a job at a printing machine located remotely from a transmission job originating station. The transmission job originating station includes a control subsystem and a document generating subsystem having a user interface for inputting job control instructions for a print job described by a job ticket. The document generating subsystem provides the print job to be delivered to the printing machine for producing a set of prints from the print job, including a set of image data, in accordance with the job ticket. The job ticket includes a set of job execution attributes with each job execution attribute being associated with a programmable set of information for defining the corresponding job execution attribute. A first one of the programmable sets of information instructs the printing system as to a manner in which the transmission job originating station is to generate job information when at least a portion of the set of image data is processed in accordance with the job ticket, and a second one of the programmable sets of information lists one or more confirmation destinations with each confirmation destination being disposed remotely of the transmission job originating station. The method includes the steps of: using the user interface to program the second set of information with the one or more confirmation destinations; processing at least a portion of the image data at the printing machine; and in response to said processing, reading the second set of job information, with the transmission job originating station, for determining each confirmation destination, programmed with said programming, to which the job information is to be transmitted.

In accordance with a fourth aspect of the present invention, there is provided a method for transmitting a facsimile document. The method provides a source of image data and transmits image data to a first remote receiving station. Job status information is received from the first remote receiving station, and the job status information is transmitted to a second remote receiving station.

In accordance with a fifth aspect of the present invention, there is provided a method for printing a job in a printing system with a printing machine for producing a set of prints from a print job including a document with the document being delivered from a transmission job originating station to the printing machine for execution of the document. The transmission job originating station further includes a troubleshooting subsystem for assisting a user to facilitate further processing of the print job in the event that one or more difficulties arise during processing of the document. The method includes: processing, with the printing system, at least a portion of the document; in response to both an event occurring during said processing and reading, with the transmission job originating station, information preprogrammed by the user at the transmission job originating station, creating a link between the troubleshooting subsystem and the user with the user being disposed at a location remote to the transmission job originating station; and the troubleshooting subsystem performing a selected operation on the print job in response to an input from the user at the location remote to the transmission job originating station.

Further objects and advantages of the present invention will become apparent from the following description of the various features of the present invention.

BRIEF DESCRIPTION OF THE DRAWINGS

The following is a brief description of each drawing used in describing the present invention, and thus, the drawings are being presented for illustrative purposes only and should not be limitative of the scope of the present invention, wherein.

DETAILED DESCRIPTION OF THE DRAWINGS

Figure 1:
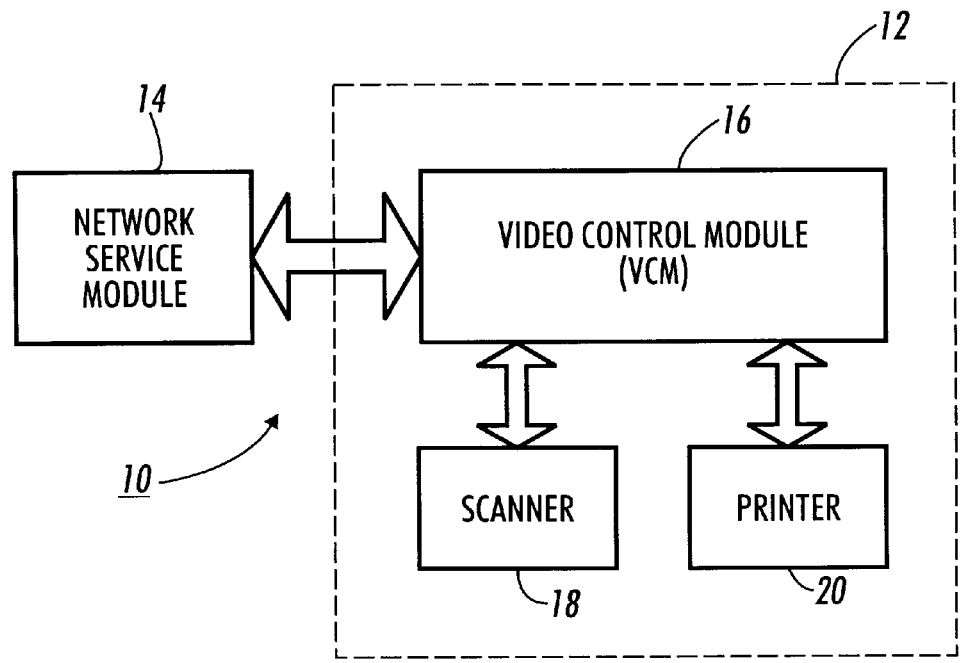
FIG. 1 is a block diagram depicting a multi-functional, network adaptive printing machine.

The following is a detailed description of the drawings illustrating the present invention. In this description, as well as in the drawings, like reference numerals have been utilized to represent like devices, circuits, or equivalent circuits performing the same or equivalent functions.

In the following description, as well as throughout the specification, the term "transmission job originating station" has been used to describe the concepts of the present invention. Transmission job originating station refers to the facsimile machine or multi-functional printing device from which the transmit/printing job was programmed. Transmission job originating station also refers to the workstation from which the transmit/printing job was programmed. The facsimile machine, multi-functional printing device, or facsimile modem used to transmit the print job is merely the transmitting station, not the transmission job originating station.

Referring to FIG. 1, a multi-functional, network adaptive printing system is designated by numeral 10. The printing system 10 includes a printing machine 12 operatively coupled with a network service module 14. The printing machine 12 includes an electronic subsystem 16, referred to as a video control module (VCM), communicating with a scanner 18 and a printer 20. In one example, the VCM 16, which will be described in further detail below, coordinates the operation of the scanner and printer in a digital copying arrangement. In a digital copying arrangement, the scanner 18 (also referred to as an image input terminal (IIT)) reads an image on an original document by using a CCD sensor, full width array sensor, or other photosensitive device capable of converting light to electrical signals. The electrical signals are converted to multi-level digital signals. In turn, an image processing system 22 (FIG. 2), associated with the scanner 18, executes signal correction and the like, and a compressor 62 compresses the multi-level signals which are then preferably stored in an electronic precollation (EPC) memory 24.

Referring again to FIG. 1, the printer 20 (also referred to as an image output terminal (IOT)) preferably includes a xerographic print engine, but may include an inkjet device or other image marking device which is capable of rendering an electronic image onto a substrate.

In the xerographic example, the print engine has a multi-pitch belt (not shown) which is written on with an imaging source, such as a synchronous source (e.g. laser raster output scanning device) or an asynchronous source (e.g. LED print bar). In a printing context, the multi-level image data is read out of the EPC memory 24 (FIG. 2) and is converted to printing data by an image processing system 23. The printing data generated by the image processing system 23 is used to control the turning ON and OFF of the imaging source so as to form a latent image on a photoreceptor. The latent image is then developed with, for example, a hybrid jumping development technique and transferred to a print media sheet. Upon fusing the resulting print, the resulting print may be inverted for duplexing or simply outputted.

Figure 2:
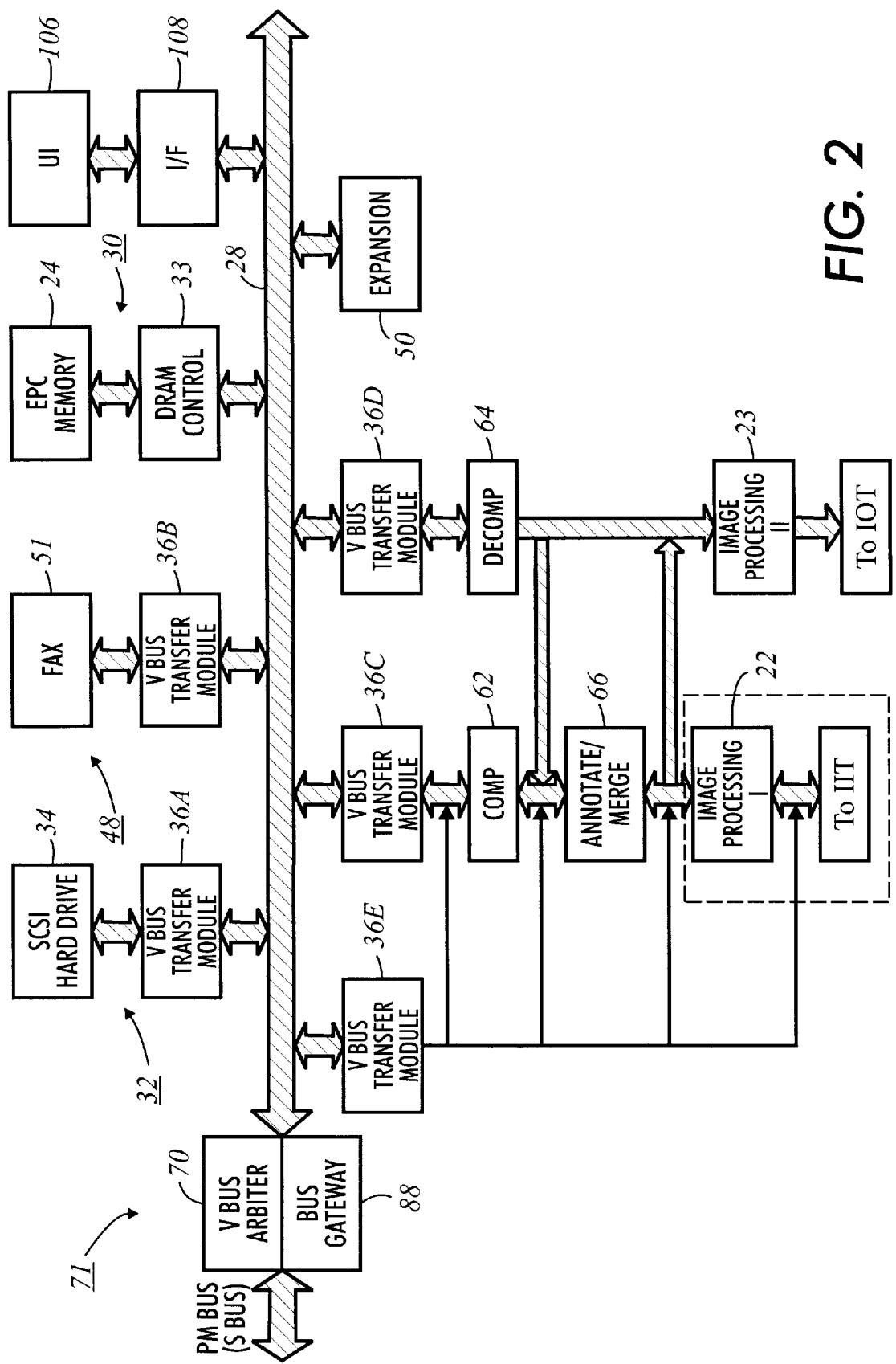
FIG. 2 is a block diagram of a video control module for the printing machine of FIG. 1.

Referring specifically to FIG. 2, the VCM 16 will be discussed in further detail. The VCM 16 includes a video bus (VBus) 28 with which various I/O, data transfer components and storage components communicate. Preferably, the VBus 28 is a high speed, 32 bit data burst transfer bus which is expandable to 64 bit. The 32 bit implementation has a sustainable maximum bandwidth of approximately 60 MBytes/sec. In one example, the bandwidth of the VBus 28 is as high as 100 MBytes/sec.

The storage components of the VCM reside in the EPC memory section 30 and the mass memory section 32. The EPC memory section includes the EPC memory 24, the EPC memory 24 being coupled with the VBus by way of a DRAM controller 33. The EPC memory 24, which is preferably DRAM, provides expansion up to 64 MBytes, by way of two high density 32 bit SIMM modules. The mass memory section 32 includes a SCSI hard drive device 34 coupled to the VBus 28 by way of a transfer module 36A. Other I/O and processing components are coupled respectively to the VBus 28 by way of transfer modules 36B, 36C, 36D, and 36F. It will be appreciated that other devices (e.g. a workstation) could be coupled to the VBus by way a transfer module through use of a suitable interface and a SCSI line.

Figure 3:
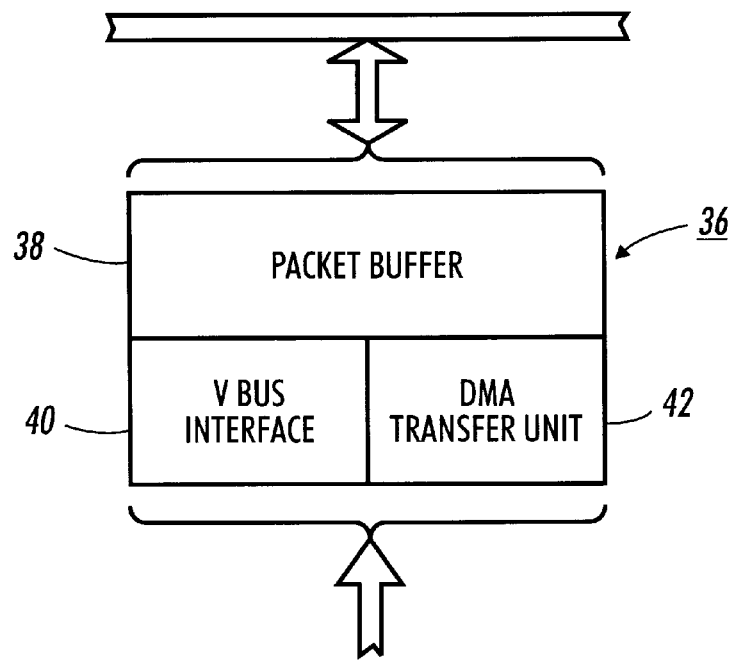
FIG. 3 is a block diagram of a transfer module used in conjunction with the printing machine of FIG. 2.

Referring to FIG. 3, the structure of one of the transfer modules 36 is discussed in further detail. The illustrated transfer module 36 of FIG. 3 includes a packet buffer 38, a VBus interface 40 and DMA transfer unit 42. The transfer module 36, which was designed with "VHSIC" Hardware Description Language (VHDL), is a programmable arrangement permitting packets of image data to be transmitted along the VBus at a relatively high transfer rate in particular, the packet buffer 38 is programmable so that the segment or packet can be varied according to the available bandwidth of the VBus 28. In one example, the packet buffer 38 can programmed to handle packets of up to 64 Bytes. Preferably, the packet size would be reduced for times when the VBus 28 is relatively busy and increased for times when activity on the bus is relatively low.

Figure 5:
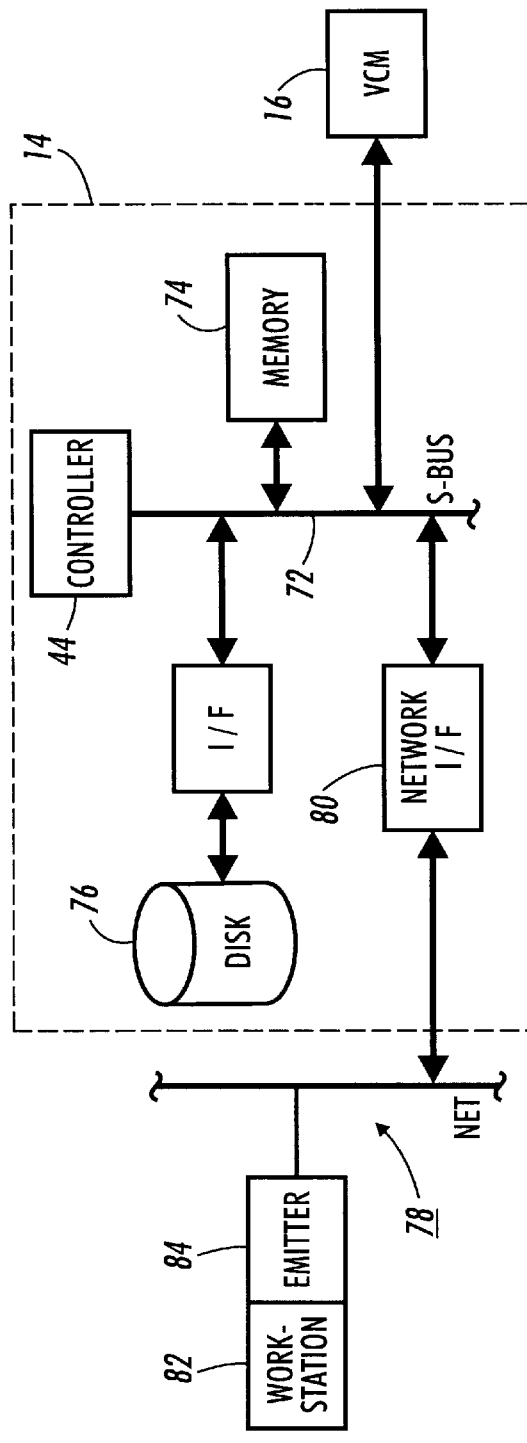
FIG. 5 is a block diagram of a network controller for the printing machine of FIG. 1.

Adjustment of the packet size is achieved with the VBus interface 40 and a system controller 44 (FIG. 5). Essentially, the VBus interface 40 is an arrangement of logical components, including, among others, address counters, decoders and state machines, which provides the transfer module 36 with a selected degree of intelligence. The interface 40 communicates with the system controller 44 (FIG. 5) to keep track of desired packet size and, in turn, this knowledge is used to adjust the packet size of the packet buffer 38, in accordance with bus conditions. That is, the controller 44 (FIG. 5), in view of its knowledge regarding conditions on the VBus 28, passes directives to the interface 40 so that the interface 40 can adjust packet size accordingly. Further discussion regarding operation of the transfer module 36 is provided below.

More particularly, for each image, the DMA transfer unit 42 employs a conventional DMA transfer strategy to transfer the packets. In other words, the beginning and end addresses of the packet are used by the transfer unit 42 in implementing a given transfer. When a transfer is complete, the interface 40 transmits a signal back to the system controller 44 of FIG. 5 so that further information, such as desired packet size and address designations, can be obtained.

Figure 4:
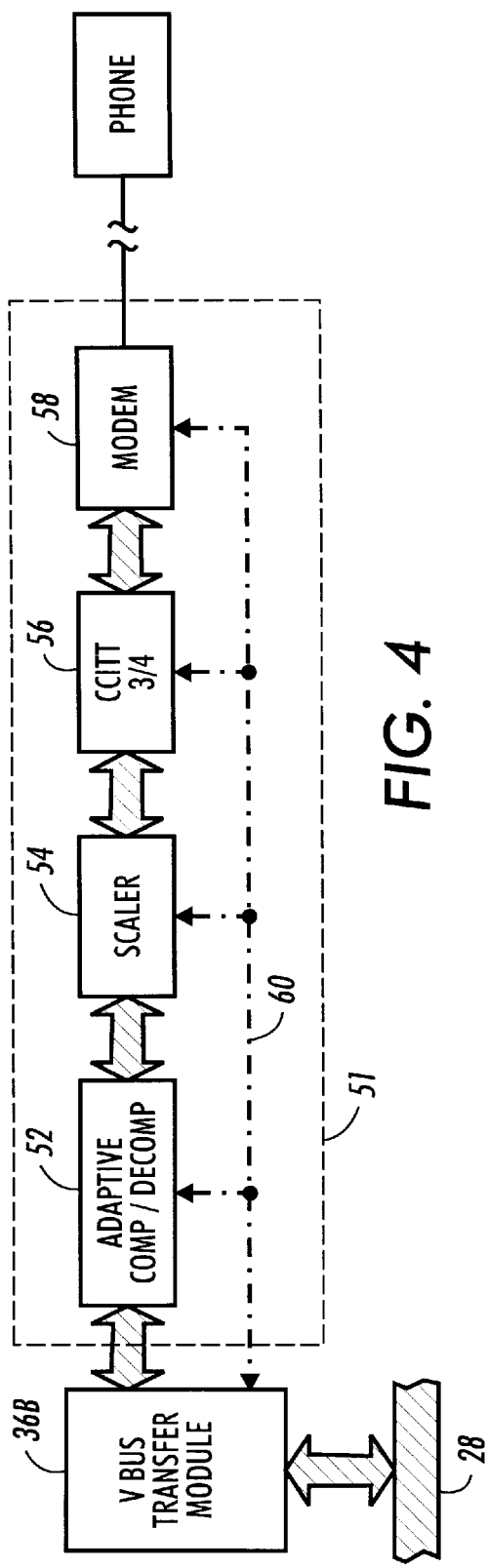
FIG. 4 is a block diagram of a facsimile card used in conjunction with the printing machine of FIG. 2.

Referring to FIGS. 1 and 2, three I/O components are shown as being coupled operatively to the VBus 28, namely a FAX module 48, the scanner or IIT 18, and the printer or IOT 20; however, it should be recognized that a wide variety of components could be coupled to the VBus 28 by way an expansion slot 50. Referring to FIG. 4, an implementation for the FAX module, which is coupled to the VBus 28 by way of transfer module 36B, is discussed in further detail.

In the preferred embodiment, a facsimile device (FAX) 51 includes a chain of components, namely a section 52 for performing adaptive compression/decompression, a section 54 for scaling the compressed image data, a section 56 for converting the scaled compressed image data to or from CCITT format, and a modem 58 for transmitting CCITT formatted data from or to a telecommunication network, by way of a conventional communication line.

Referring still to FIG. 4, each of the sections 52, 54, and 56, as well as, modem 58 are coupled with the transfer module 36B by way of a control line 60. This permits transfers to be made to and from the FAX module 48 without involving a processor. As should be understood, the transfer module 36B can serve as a master or slave for the FAX module 48 in that the transfer module 36B can provide image data to the FAX module 48 for purposes of transmission or receive an incoming FAX. In operation, the transfer module 36B reacts to the FAX module 48 in the same manner that it would react to any other I/O component. For example, to transmit a FAX job, the transfer module 36B feeds packets of image data to the section 52 through use of the DMA transfer unit 42 and, once a packet is fed, the transfer module 48 transmits an interrupt signal to the system processor 44 requesting another packet.

In one embodiment, two packets are maintained in the packet buffer 38 so that "ping-ponging" can occur between the two packets. In this way, the transfer module 36B does not run out of image data even when the controller 44 cannot get back to the transfer module 36B immediately upon receiving an interrupt signal.

Referring again to FIG. 2, the IIT 18 and IOT 20 are operatively coupled to the VBus 28 by transfer modules 36C and 36D. Additionally, the IIT 18 and the IOT 20 are operatively coupled with a compressor 62 and a decompressor 64, respectively. The compressor and decompressor are preferably provided by way of a single module. In practice, at least some of the functionality of the transfer modules is provided by way of a 3 channel DVMA device, which device provides local arbitration for the compression/decompression module.

As further illustrated by FIG. 2, the scanner 18, which includes the image processing system 22, is coupled with an annotate/merge module 66. Preferably the image processing system 22 includes one or more dedicated processors programmed to perform various desired functions, such as image enhancement, thresholding/screening, rotation, resolution conversion, and TRC adjustment. The selective activation of each of these functions can be coordinated by a group of image processing control registers, the registers being programmed by the system controller 44. Preferably, the functions are arranged along a "pipeline" in which image data is inputted to one end of the pipeline, and processed image data is outputted at the other end of the pipeline.

To facilitate throughput, transfer module 36E is positioned at one end of the image processing system 22 and transfer module 36C is positioned at another end of the image processing system 22. Positioning of transfer modules 36C and 36E in this manner greatly facilitates the concurrency of a loopback process.

Referring still to FIG. 2, arbitration of the various bus masters of the VCM 16 is implemented by way of a VBus arbiter 70 disposed in a VBus arbiter/bus gateway 71. The VBus arbiter 70 determines which bus master (e.g. FAX module, Scanner, Printer, SCSI Hard Drive, EPC Memory or Network Service Component) can access the VBus 28 at one given time. The VBus arbiter 70 is made up of two main sections and a third control section.

The first section, i.e., the "Hi-Pass" section, receives input bus requests and current priority selection and outputs a grant corresponding to the highest priority request pending. The current priority selection input is the output from the second section of the VBus arbiter 70 and is referred to as "Priority Select". This section implements a priority rotation and selection algorithm. At any given moment, the output of the logic for Priority Select determines the order in which pending requests will be serviced. The input to Priority Select is a register which holds an initial placement of devices on a priority chain. On servicing requests, this logic moves the devices up and down the priority chain, thereby selecting the position of a device's next request. Control logic synchronizes the tasks of the Hi-Pass and the Priority Select by monitoring signals regarding request/grant activity. It also prevents the possibility of race conditions.

Referring to FIG. 5, a network service module 14 is discussed in further detail. As will be recognized by those skilled in the art, the architecture of the network service module 14 is similar to that of a known "PC clone". More particularly, in the preferred embodiment, the controller 44 is coupled with a standard SBus 72. In the illustrated embodiment of FIG. 5, a host memory 74, which preferably assumes the form of DRAM, and a SCSI disk drive device 76 are coupled operatively to the SBus 72. While not shown in FIG. 5, a storage or I/O device could be coupled with the SBus 72 with a suitable interface chip. As further shown in FIG. 5, the SBus 72 is coupled with a network 78 by way of an appropriate network interface 80. The network interface includes all of the hardware and software necessary to relate the hardware/software components of the controller 44 with the hardware/software components of the network 78.

In one example, the network 78 includes a client, such as a workstation 82 with an emitter or driver 84. In operation, a user may generate a job including a plurality of electronic pages and a set of processing instructions. In turn, the job is converted, with the emitter, into a representation written in a page description language, such as PostScript. The job is then transmitted to the controller 44 where it is interpreted with a decomposer. Some of the principles underlying the concept of interpreting a PDL job are provided in U.S. application Ser. No. 07/898,761 entitled "Apparatus and Method for Multi-Stage/Multi-Process Decomposing", filed on Jun. 12, 1992, by Bonk et al., and U.S. Pat. No. 5,226,112 to Mensing et al., the pertinent portions of both references being incorporated herein by reference.

Referring again to FIG. 2, the network service module 14 is coupled with the VCM 16 via a bus gateway 88 of the VBus arbiter/bus gateway 71. In one example, the bus gateway 88 comprises a field programmable gate array. The bus gateway 88 provides the interface between the host SBus 72 of FIG. 5 and the VCM VBus 28. It provides VBus address translation for accesses to address spaces in the VBus real address range, and passes a virtual address to the host SBus 72 of FIG. 5 for virtual addresses in the host address range. A DMA channel for memory to memory transfers is also implemented in the bus gateway 88. Among other things, the bus gateway 88 provides seamless access between the VBus 28 and SBus 72, and decodes virtual addresses from bus masters, such as one of the transfer modules 36, so that an identifier can be obtained from a corresponding slave component. It will be appreciated by those skilled in the art that many components of the printing system 10 are implemented in the form of a single ASIC.

Referring to FIGS. 2, 3 and 5, further discussion regarding DMA transfer of each of the transfer modules 36 is provided. In particular, in one example, the images of a job are stored in the host memory 74 as a series of blocks. Preferably, each block comprises a plurality of packets. In operation, one of the transfer modules 36 is provided, by the controller 44, with the beginning address of a block and the size of the block. In turn, for that block, the transfer module 36 effects a packet transfer and increments/decrements a counter. This procedure is repeated for each packet of the block until the interface 40 determines, by reference to the counter, that the last packet of the block has been transferred. Typically, for each stored image, several blocks are transferred, in a packet-by-packet manner, as described immediately above.

Figure 6:
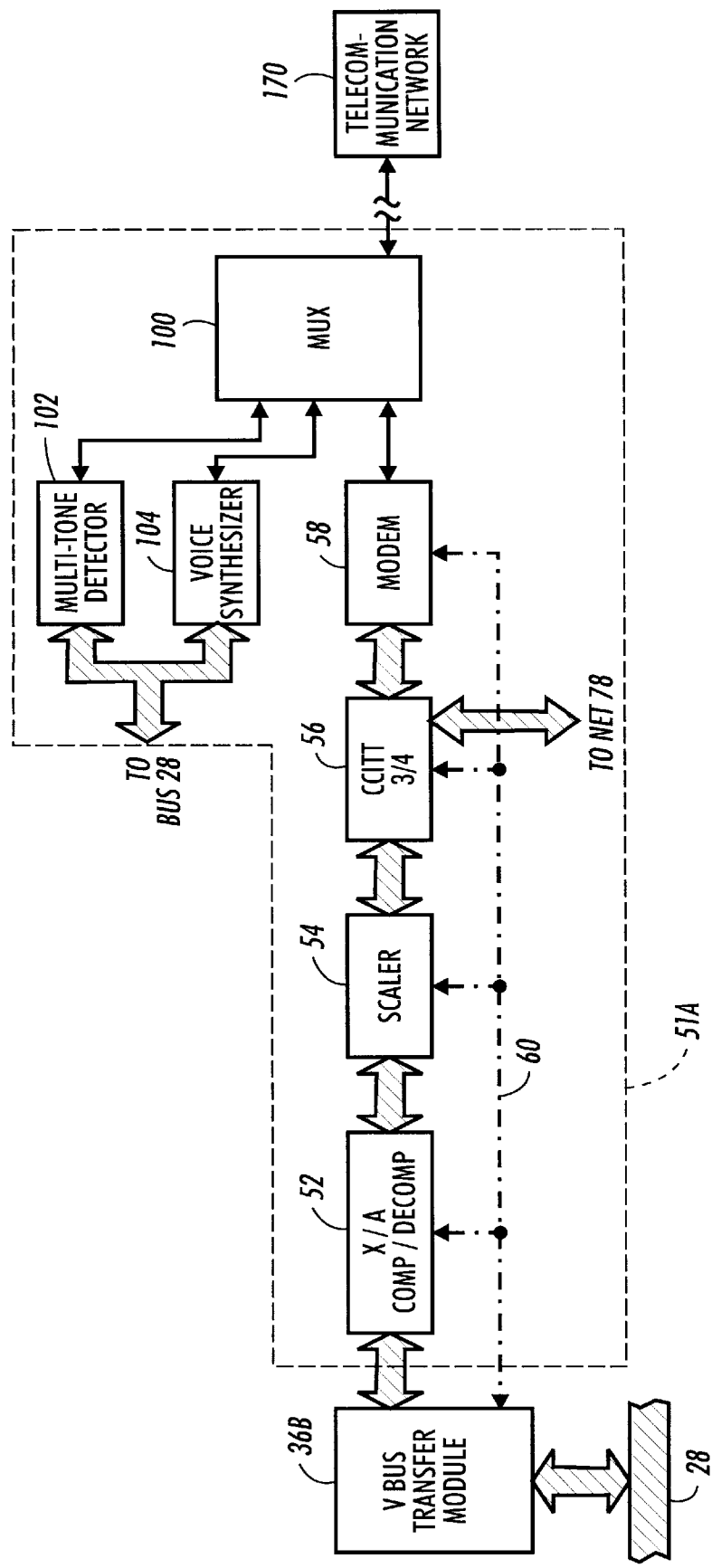
FIG. 6 is a block diagram of the facsimile card of FIG. 4 modified to provide a platform for performing a technique in accordance with the present invention.

Referring to FIG. 6, a FAX module, which is shown as being modified to accommodate the technique of the preferred embodiment, is designated with numeral 51a. The FAX module 51a differs from the FAX module 51 of FIG. 4 in that the modem 58, rather than communicating directly with a telecommunication network 170 is coupled with a 3:1 bidirectional multiplexer (MUX) 100. Further inputs to the MUX include a multi-tone detector 102 and a voice synthesizer 104, the significance of which, to the preferred technique, will be discussed below.

The detector 102 and synthesizer 104, which are implemented with conventional telecommunication components, communicate with the bus 28 so that multi-bit data can flow freely between the telecommunication network 170 and memory (system memory 74 and disk 76 (FIG. 5)) under the influence of the controller 44. As will be appreciated, messages can be stored in disk 76 and transmitted to the telecommunication network 170 with the voice synthesizer 104. Moreover, interactive communication between the telecommunication network 170 and the controller 44, with its attendant memory, can be achieved with the multi-tone detector 102. Finally, control of communication to and from the telecommunication network 170 is facilitated by the controller by way of the control line 61.

Figure 7:
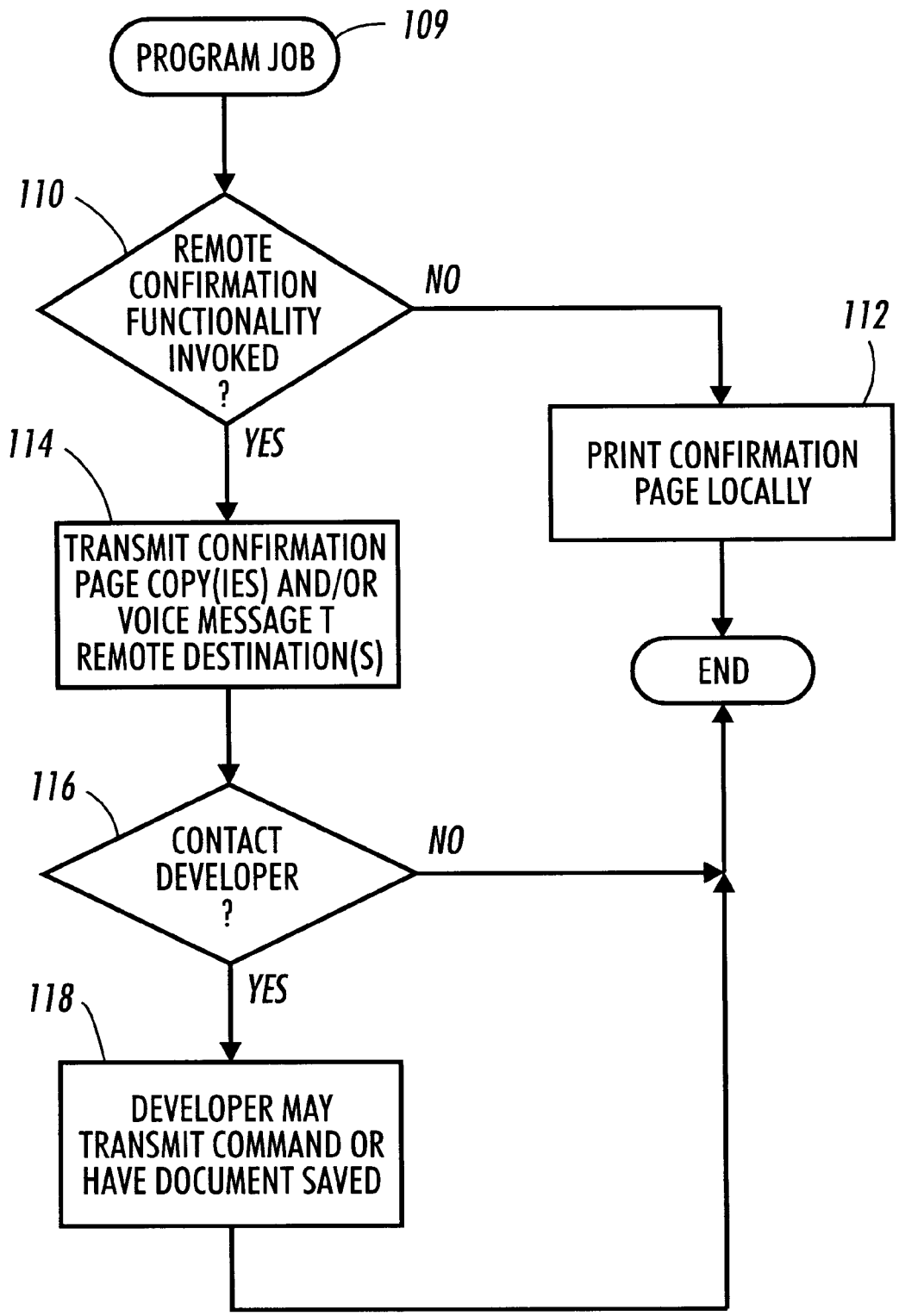
FIG. 7 is a flow diagram representing an overview of the technique of the present invention.

Referring to FIG. 7, an overview of the preferred embodiment of the present invention is discussed briefly. A print job is programmed initially at the transmission job originating station by way of a subroutine 109 with, in one example, a suitable dialog (not shown) provided by way of an appropriate user interface (UI) 106 of FIG. 2, the UI 106 preferably including a display screen (not shown) and being coupled with the bus 28 by way of a conventional interface 108. As will be appreciated, the transmission job originating station could be a workstation 82. A job is then, or at some pre-specified later time, processed and, if the corresponding job program is a standard program without the requirement of remote informing (see query 110), an information (e.g. confirmation) sheet is provided locally (step 112) at the transmission job originating station. If the transmission job originating station is a facsimile machine or multi-functional printing device, the confirmation sheet is printed by the local print engine associated with the transmission job originating station, or if the transmission job originating station is a workstation, the confirmation is displayed on the display screen associated with the workstation.

On the other hand, if the program calls for a remote job information indication, the confirmation information is provided by way of a subroutine 114 which, in response to attendant programming, transmits confirmation information to one or more suitable output devices (e.g. a printer and/or a telecommunication device) which are remote to the transmission job originating station. As will be appreciated, the information provided to a consumer or user may not be a confirmation, but rather may include information indicating the print job, for one reason or another could not be processed. Accordingly, while the present description refers to "confirmation" it will be understood that a confirmation notice contemplates those situations in which non-confirming information is provided to the user.

Referring to query 116, it may be desirable to direct the transmission job originating station to contact the user in the event that a fault in job processing occurs. Such a situation may arise during printing of the print job because a font is unavailable at the host printing machine. In this event, the user or developer of the job may take some action (step 118), such as editing the job, to overcome the fault and thus permit the job to be retransmitted to the host printing machine for successful printing. In another contemplated situation, the user may simply store the job in order to take an action on the job at a future time.

Figure 8:
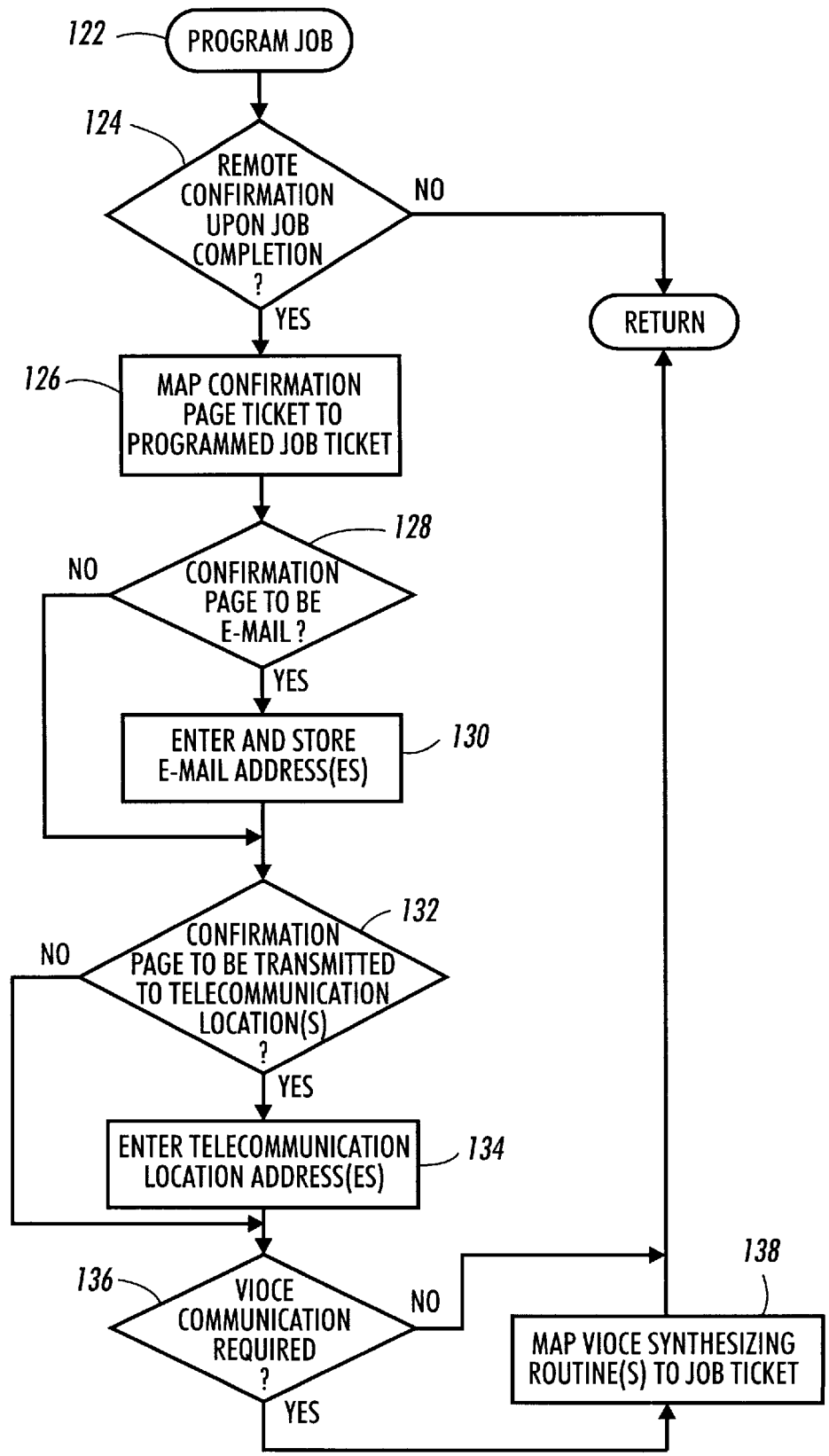
FIG. 8 is a flow diagram representing a subroutine for programming a job ticket with confirmation destinations.

Referring now to FIG. 8, a detailed discussion of the above-mentioned subroutine 109 is provided. Initially, at step 122, a user sets values for a job ticket, the job ticket providing, among other things, control information for executing the corresponding print job. Background information for job tickets, and an approach for setting attribute values therein, can be found in U.S. Pat. No. 5,271,065 to Rourke et al., the entire contents of which are incorporated herein by reference. Upon completing programming to facilitate printing, query 124 is used to determine if the program developer seeks to deliver job confirmation information remotely of the site at which the user is programming the job; i.e., query 124 is used to determine if the program developer seeks to deliver job confirmation information to a station that is remote of the transmission job originating station.

Assuming that remote confirmation functionality is desired, various steps are employed to designate the destination(s) to which the confirmation is to be delivered. It is contemplated that software, other than that alluded to in the illustrated embodiment of FIG. 8 would be required to facilitate transmission of confirmation information to the designated confirmation destination(s). For one, a program would be required to gather the confirmation information for eventual output and, for another, directions for transmission by, for example, a server to destination(s) across an associated network would be required. Any conventional software application which can implement the information gathering and subsequent transmission routines can be utilized to carry out this aspect of the present invention.

To program one or more confirmation destinations, a page ticket, specifically listing confirmation destinations is mapped to the general job ticket (step 126) and a determination is made, by way of step 128, as to whether confirmation information is to be delivered to one or more E-Mail destinations. If one or more of the confirmation destinations include E-Mail destinations, then one or more suitable E-Mail addresses are entered and stored (step 130). It will be appreciated that E-Mail addresses could be stored in a database, prior to the programming of subroutine 109, so an E-Mail address could be listed automatically in the mapped page ticket in response to the provision of a corresponding name.

If one or more confirmation destinations are to be transmitted by way of a telecommunications network (step 132), then one or more telecommunication addresses (e.g. telephone numbers) are, via step 134, entered. It will be appreciated that confirmation messages can be delivered to a user in terms of a voice connection (step 136), electronic data, or a FAX reproduction. In the event that the receiver is a FAX device, the process returns to the main program. If the receiver is an E-Mail destination, the confirmation information is placed into an E-Mail note and the note is transmitted to the receiver. In the event, however, that confirmation is to be provided by voice, one or more voice messages, preferably prestored in the disk 76 (FIG. 5), are mapped, via step 138, to one or more confirmation locations.

Figure 9:
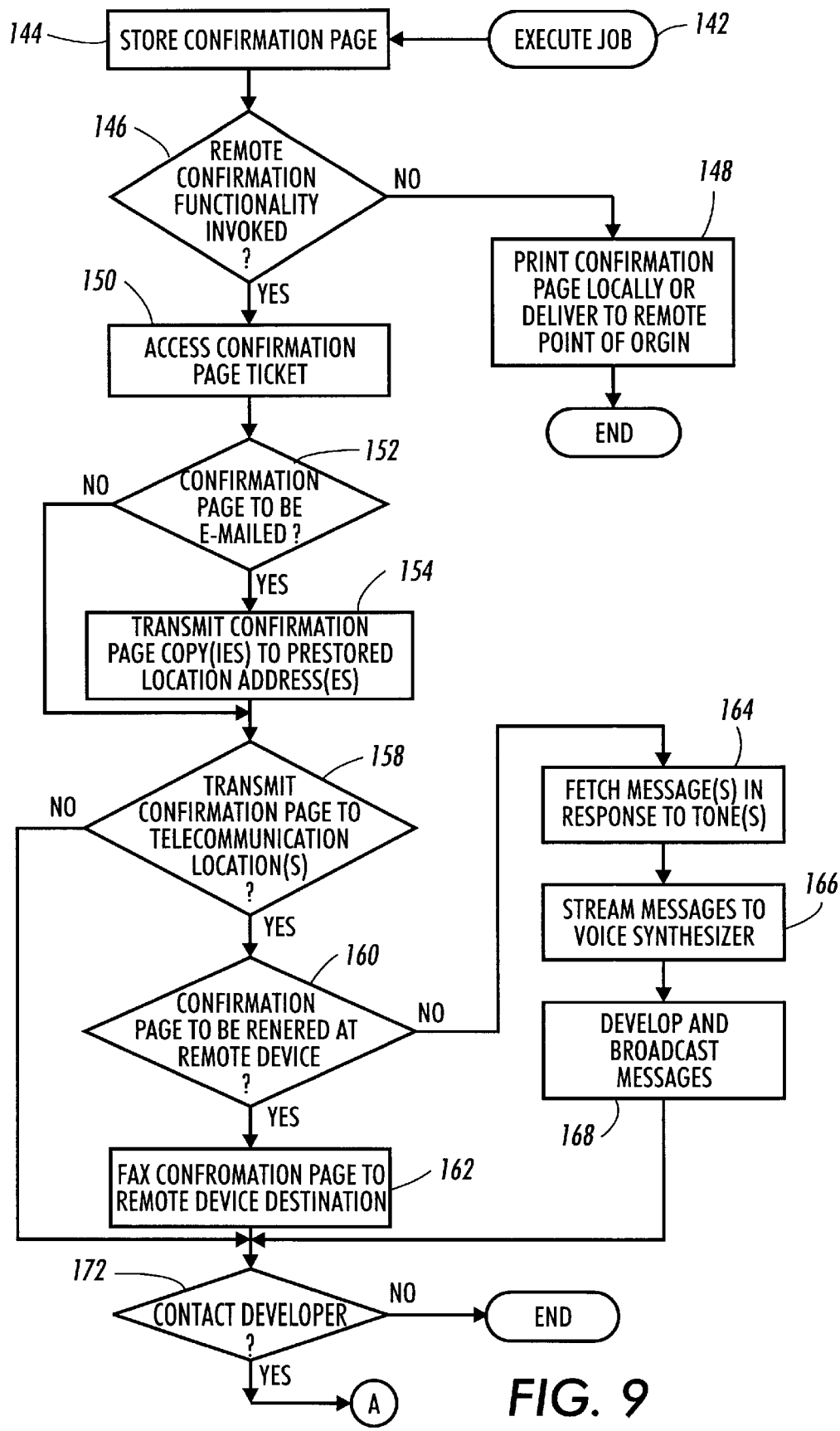
FIG. 9 is a flow diagram representing a subroutine for transmitting a job information page to one or more confirmation destinations.

Referring to FIG. 9, in the preferred embodiment, at least a portion of the job is executed (step 142) and a confirmation (or information) page is generated for buffering or storing (step 144). If remote confirmation is not required by the job program (see query 146), then the confirmation page is printed at the print engine local to the transmission job originating station if this station is a facsimile machine or a multi-functional printing device (step 148), or displayed on a display screen associated with the transmission job originating station if this station is a workstation; i.e., the confirmation information is transmitted back to the point from which the print job was sourced. It will be understood that the software for generating the job information sheet and transmitting it across the network to the point of job origin is conventional.

If the job ticket is programmed for remote functionality, the page ticket, provided by way of the illustrated procedure of FIG. 8, is accessed at step 150. Pursuant to transmitting the confirmation information, it is determined, by way of step 152, if any of the one or more confirmation destinations of the page ticket relate to an E-Mail address. If E-Mail is called for, then the stored E-Mail address(es) are accessed (step 154) for transmitting a copy of a confirmation page by way of the network, to one or more predesignated E-Mail addresses. It will be appreciated that the present embodiment contemplates transmission of E-Mail to any point along the emerging electronic "superhighway".

In addition to processing any E-Mail confirmation(s), it is determined, via step 158, whether any of the confirmation information is to be transmitted to one or more telecommunication locations. In one example (steps 160 and 162) the confirmation information is to be transmitted to a FAX device, in the form of an electronic FAX page, for development of a FAX reproduction at a suitable FAX device. It is contemplated that a confirmation page could be developed by obtaining a suitable form, with blank fields, from disk 76 (FIG. 5) and filling in the fields with the controller 44 by reference to the job ticket and system data generated as a result of processing the print job. The system would provide information, such as when the job was printed and any faults that may have arisen during processing of the print job. An arrangement suitable for this sort of form printing can be found in UK Patent Application 2,198,566A.

In another example (steps 160, 164, 166 and 168), a voice message is transmitted to one or more confirmation destinations. For voice transmission, the system determines what job run information is appropriate for transmission to the confirmation destination(s) and broadcasts the same to the one or more confirmation destinations. To appreciate the message transmission technique illustrated in FIG. 9, reference is made to FIGS. 5 and 6 along with the following example.

A job is either developed at the printing system 10 (facsimile machine or multi-functional printing device) or transmitted to the printing system (facsimile machine, multi-functional printing device, modem, or other telecommunication port) from the workstation 82. The program for the job indicates that any confirmation information is to be provided to the user's phone through telecommunication network 170 at location 171. When the job is printed, the controller 44, accesses a file in the disk 76 that includes information indicating that the job has been printed. In turn, the message is streamed to the voice synthesizer 104 for converting the digitally encoded information of the file into a suitable format for transmission to the user's phone through telecommunication network 170. The suitably formatted information is then transmitted to the MUX 100 for broadcast to the confirmation destination 171.

In a facsimile embodiment of the present invention, a facsimile machine includes an image data source for providing the image data to be transmitted. This image source may be a scanner or workstation or other type of device capable of creating image data. A transmitting subsystem of the facsimile machine transmits the image data to a first remote receiving station. The first remote receiving station may be another facsimile machine, a networked printer, or multi-functional printing device. A receiving subsystem of the facsimile machine receives job status information from the first remote receiving station. Then a control subsystem of the facsimile machine causes the transmitting subsystem to transmit the job status information to a second remote receiving station. The second remote receiving station may be a facsimile machine, workstation, a telephonic device, a networked printer, an E-mail destination, a multi-functional printing device, or other device capable of receiving information from a network and conveying the information human recognizable form.

The facsimile machine can also be interactive with the second remote receiving station and cause a query to be sent to the second remote receiving station. In this example, the facsimile machine will perform a predetermined set of functions in response to information, corresponding to the query, received from the second remote receiving station. Examples of these functions are causing the facsimile machine to transmit the image data to a third remote receiving station; causing the facsimile machine to retransmit the image data to the first remote receiving station; causing the facsimile machine to store the image data in a local memory, etc.

As will be recognized, not all jobs are executable due to, among other things inconsistencies between the job ticket and the capabilities of the host printer. To appreciate what can "go wrong", during the execution of a print job, reference is made to the following example.

The same job referred to above is provided to the printing system with a font call for "helvetica". Unbeknownst to the job developer, this font is unavailable in the printing system and the printing system is not programmed to make a substitution for that font. Accordingly, the controller fetches a message from disk, indicating the unavailability of the font, and sends it off to the user's phone through telecommunication network 170, by use of the voice synthesizer 102 (FIG. 6). In a another example, a host FAX device may not be able to print the abovementioned job simply because it is out of toner.

It should be recognized that by only providing the fault information, the event can give rise to a frustrating situation for a user who needs the job printed immediately and has the wherewithal to change the job and resubmit it to the printer. Moreover, these situations may be especially frustrating for the user who requires immediate printing because the printing fault may be resolved by simply having someone on-site, relative to the FAX device, provide toner and resending the job.

Figure 10:
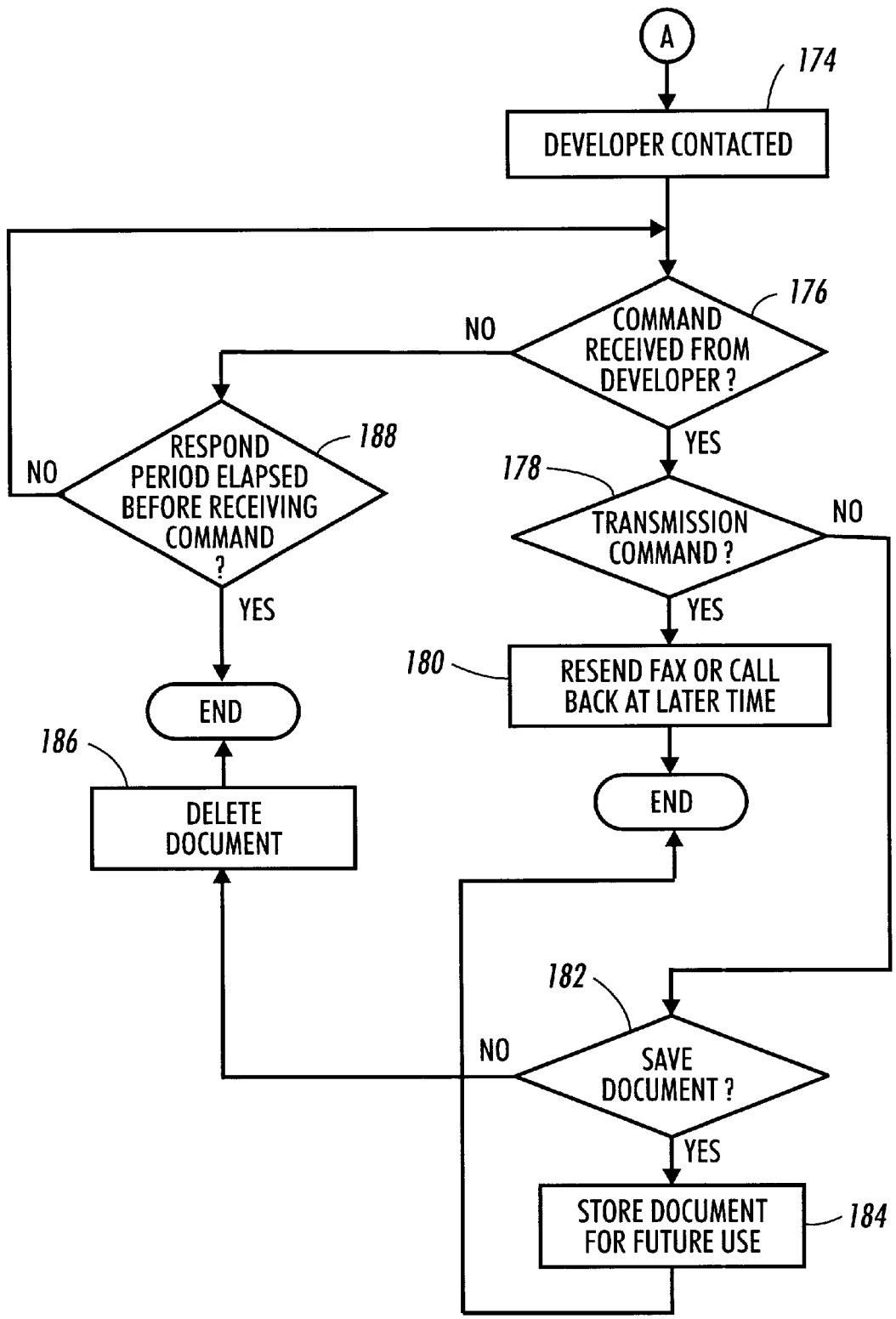
FIG. 10 is a flow diagram representing a subroutine for implementing an interactive program between a user and a troubleshooting subsystem to perform an operation on a job which encounters operational difficulties during processing thereof.

A possible solution to this problem is contemplated in another embodiment of the present invention. Referring to step 172 of FIG. 9 and FIG. 10, an interactive technique for providing an advantageous solution to the above-described situations is discussed. Assuming that the originator of the job is contacted with a system problem (step 172 of FIG. 9 and step 174 of FIG. 10), a troubleshooting subsystem, which may be implemented on the printing system 10 (facsimile machine or multi-functional printing device) or any system (e.g. workstation) communicating with the printing system 10 and having suitable structure and functionality, awaits a telephonic command from the user (step 176) in the form of one or more tones, each tone or set of tones corresponding with a preprogrammed command for the system. It will be appreciated that the technique of the preferred embodiment contemplates the use of a wide range of telephonic device so that the user could even provide input from a "beeper" or a cellular telephone while"on the run".

Upon receiving a command from the user, the system determines, at step 178, whether the command is directed toward a "transmission" command or a "save document" command. It will, of course, be appreciated that the commands of the illustrated embodiment are exemplary and other commands are contemplated by the preferred embodiment. For example, another command might include an "inform other" where a key operator of a printing machine is notified of a problem in the printing system 10 by way of the voice synthesizer 104 (FIG. 6).

Referring a first case for step 180, it is understood that, in one instance, a user may desire to be called back at a later time because the user is not presently at a given confirmation site. This situation further contemplates another command in which the controller obtains a phone number of another location at which the user may reside. In other words, the command may assume the form of either "Call me back at . . . " or "Call 'so and so' at 'such and such' a number". It will be understood that these commands are provided by way of conventional interactive telephonic software used in conjunction with the multi-tone device of the type shown in FIG. 6.

In another instance of the first case, a user may wish to resend a job, after editing it, or simply have it sent to another printer which may possess the capabilities demanded by the job ticket. To appreciate the edit and resend scenario, reference is made again to the illustrated embodiment of FIG. 6 and the example described above in which printing was faulted due to the lack of helvetica font. In particular, the user may wish to change the font of the faulted document to a font that is known to reside in the printing system. Moreover, the user may possess a document editing device 181 (FIG. 6), communicating with the NET 78, that permits the user to both access the job at the workstation 82 (FIG. 5) or the memory (system memory 74 or disk 76) and make the appropriate change in font call(s). In turn, upon editing the job, the user can have it resent for execution.

It should be recognized that the resend and call back commands can be used in conjunction to considerable advantage. That is, in one example, the user can indicate that the user desires to be called back later, after having time to edit a document, for the purpose of resending the edited document to a particular machine. In another example, the user can call a key operator to remedy a fault, e.g. overcoming a toner deficiency, and then provide a resend command. Alternatively, the resend command could include a delay so that a period of time in which to overcome a fault would be provided.

Referring to steps 182 and 184, there are certain circumstances in which it may be desirable to simply store a document for future processing. In one example, it may be known that, in view of the nature of an indicated fault, printing of a subject document may not be feasible in the immediate future. For this example, it will sometimes, as indicated by step 186, be desirable to delete the job. In another example, complete job execution may have been achieved, but the operator may seek to save the document because frequent printing of the same job, within the immediate future, is expected. The illustrated embodiment of FIG. 10 contemplates, by way of step 188, that, under some circumstances, the user will not provide a command and no further action will be taken toward executing the print job.

To illustrate the present invention in another way, the present invention will be described with respect to a facsimile environment. As noted before, conventional facsimile machines allow a person to send a fax either immediately upon the scanning of the document or at some later specified time; i.e., at a later time to avoid peaks hours or to take advantage of lower phone rates. However, since using this delay feature does not guarantee reception by the intended party, the sender does not realize the problem until the next morning when the sender checks the confirmation copies from the night before. This delay in receiving a confirmation message indicating that the fax was not properly received by the intended party can be disruptive to business.

To resolve this problem, a preferred implementation is provided in which the user is enabled to redirect the confirmation message to an off-site location. This can be accomplish by adding a subroutine to existing delay transmission programs wherein the user selects the option of redirecting the confirmation message to another location. When this option is selected, the user inputs a confirmation destination represented by, for example, a telephone number to which the confirmation message should be directed. In addition to inputting the telephone, the user selects either a human option or machine option. In this way if the user inputs a remote facsimile telephone number, the confirmation message can be faxed to this machine. However, if the user inputs a normal telephone number, a voice synthesizer within the facsimile machine will be activated upon the answering of the phone and inform the user audibly of the status of the delayed transmission. If the fax machine is connected to a network, the user would also have the option of inputting an electronic mail address.

A further modification would include an interactive system such that when the facsimile machine sent the confirmation message, which may include fault information, to a human answerable telephone, the receiver of the confirmation message could send instructions back to the facsimile machine; i.e., resend the document, send the document to an alternative number, delete document from memory, resend document at a later time, call back sender in ten minutes to receive instructions.

Numerous features of the above-described technique for developing and communicating job information will be appreciated by those skilled in the art.

First, a technique is provided for transmitting job information to one or more locations, each of which one or more locations is remote relative to both an origin of the job (transmission job originating station) and a host machine at which the job was at least partially processed. More particularly, a user can program a job ticket so that the job information can be sent to just about any location that is linked to a telecommunication network or the information superhighway. This ability to send job information to an unlimited number of output destinations makes the technique particularly advantageous to users who, for one reason or another, cannot be at the location where job information has been conventionally provided.

Second, the technique permits a high degree of flexibility with respect to output options. In one example, job information can be provided at a wide range of output destinations on a network, either by E-Mail or facsimile transmission. In another example, the job information can be provided to a wide range of output destinations on a telecommunications network.

Finally, the technique contemplates an interactive model that significantly expands the user's ability to remedy faulted jobs. More particularly, when a job is faulted, a troubleshooting subsystem contacts the user at a pre-specified location so that the user can provide the troubleshooting system with a command. In one example, the command causes the job to be stored for later execution. In another example, the user can edit the job and retransmit it to the host printing machine for execution. In another example, the user can remove a fault causing condition at the host printing machine and have the troubleshooting system call back the user, at a later time, so that the user can direct the troubleshooting system to retransmit the edited job to the host printing machine for execution. In yet another example, the user can have a subject job sent on to another printing machine when it is clear that the host printing machine is not appropriate for printing the subject job. All these possibilities are made possible by enabling the transmission job originating station to contact the user at a remote location and provide that user with confirmation and/or fault information.

Although the present invention has been described in detail above, various modifications can be implemented without departing from the spirit of the present invention. For example, the preferred embodiment of the present invention has been described with respect to a facsimile environment. However, the present invention is readily applicable to a networked printing environment wherein the print job is transmitted to a remote location and the sender desires to know the status of the job and the sender is not located at the origination site when this status information is to be communicated.

While the present invention has been described with reference to various embodiments disclosed above, it is not to be limited to the details set forth above, but is intended to cover such modifications or changes as may fall within the scope of the attached claims.

What is claimed is:

1. A method for printing a job in a printing system with a printing machine for producing a set of prints from a print job including a document with the document being delivered from a transmission job originating station to the printing machine for execution of the document, the transmission job originating station further including a troubleshooting subsystem for assisting a user to facilitate further processing of the print job in the event that one or more difficulties arise during processing of the document, comprising the steps of:

(a) processing, with the printing system, at least a portion of the document;

(b) in response to both an event occurring during said processing and reading, with the transmission job originating station, information preprogrammed by the user at the transmission job originating station, creating a link between the troubleshooting subsystem and the user with the user being disposed at a location remote to the transmission job originating station;

(c) the troubleshooting subsystem performing a selected operation on the print job in response to an input from the user at the location remote to the transmission job originating station and storing the print job in a memory section for future execution of the print job; and (d) delivering the document to the printing machine a selected time interval after execution of said steps (a)–(c).

2. The method of claim 1, further comprising the step of editing the document during the selected time interval.

3. The method of claim 2, wherein said editing step includes editing the print job at a location remote of both the transmission job originating station and the printing machine.

4. The method of claim 1, wherein said step (c) includes communicating with the user, with the troubleshooting subsystem, after a time interval, designated by the user or the printing system, has elapsed.

5. The method of claim 1, wherein said step (c) includes transmitting the print job a the second printing machine for processing thereof.

6. The method of claim 1, wherein said step (c) includes the step of terminating all current processing of the document.

* * * * *